United States Patent Office 2,890,232
Patented June 9, 1959

2,890,232

MANUFACTURE OF METAL SOAPS

Russell H. Rogers, Jr., and William R. Blew, Jr., Chicago, Ill., assignors to Swift & Company, Chicago, Ill., a corporation of Illinois No Drawing. Application May 31, 1956
Serial No. 588,265

14 Claims. (Cl. 260—414)

This invention in general relates to the manufacture of metallic soaps, and, more specifically, to the manufacture of polyvalent metal soaps of higher aliphatic monocarboxylic acids.

There are three basic methods in present commercial use in the manufacture of metallic fatty acid soaps. They are designated the double decomposition process, the fusion process, which includes the related slurry process, and the metal-acid reaction process. The first two of the above methods have been in use for some time, whereas the third is a comparatively recent innovation in the field of manufacturing of metallic soaps.

The double decomposition process involves two basic reactions: (1) reaction of aqueous caustic and the fatty acid to form a sodium soap dissolved in an aqueous phase, and (2) reaction of the sodium soap with an inorganic metal salt to form the metal soap. The fusion process involves the reaction of fatty acid and the metal oxide, hydroxide, or acetate to form the metal soap. The metal-acid reaction process involves the reaction of the free metal in powdered form with the fatty acid to form the polyvalent metal soap.

The chemistry of each of the above processes may be expressed briefly as follows:

Double decomposition process—

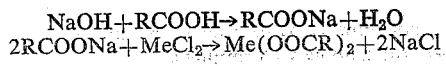

$$NaOH + RCOOH \rightarrow RCOONa + H_2O$$
$$2RCOONa + MeCl_2 \rightarrow Me(OOCR)_2 + 2NaCl$$

Fusion process—

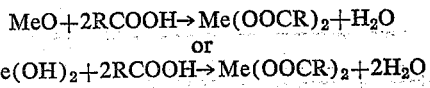

$$MeO + 2RCOOH \rightarrow Me(OOCR)_2 + H_2O$$
or
$$Me(OH)_2 + 2RCOOH \rightarrow Me(OOCR)_2 + 2H_2O$$

Metal-acid reaction process—

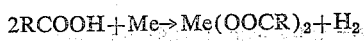

$$2RCOOH + Me \rightarrow Me(OOCR)_2 + H_2$$

Of the three methods of production, the first, or double decomposition method, is the most widely used, especially in the preparation of stearates and palmitates of aluminum, calcium, lead, zinc, and magnesium. The fusion process is generally preferred for metallic soap production. It is more direct and results in a greater economy than the double decomposition process, but is generally not used where the metal oxides or metal hydroxides do not react rapidly with the organic fatty acid, where exceptionally pure products are required, or where raw materials are not available in a high degree of purity. The metal-acid reaction process is the least widely used of the three commercial processes.

In the double decomposition process the sodium soap is formed. Thereafter, a solvent which has preferential solubility for the metallic soap to be formed is metered into the soap solution. The required amount of inorganic metallic salt solution is mixed therewith, and the temperature is increased to 190°–195° F. The mixture is held under agitation while the double decomposition reaction proceeds. The metallic soaps which are formed dissolve in the preferential solvent. After lapse of sufficient time, agitation is ceased, and the layers are allowed to separate. If tests of the lower sodium soap layer show that the reaction is complete and there is no more sodium soap, the layers are separated and the upper layer containing the metal soap, small amounts of water, and inorganic sodium salt, is pumped to a vacuum evaporator and heat is applied until all the water and sufficient solvent are distilled over so that the metallic soap is at the desired or higher concentration.

The above process is currently in use in the United States. There are a few modifications of the foregoing double decomposition process used in the United States. The most widely used alternative process is known as the "solvent-free" process. It is quite similar to the process described above except that the metallic soap, when formed, precipitates from the soap solution instead of dissolving in the preferential solvent. The precipitation process is more difficult to operate because there are more possibilities of side reactions, which eventually result in gelling and occlusion of inorganic salts and alkali soaps. The sodium salt formed during the final precipitation must be removed by several washings with water. A longer drying period is required to drive off entrained water, and a higher temperature is required for complete elimination of hydrated water.

The fusion process is generally carried out under steam pressure at temperatures in the range of 325°–400° F. or higher. The reaction normally takes about 3½ to 5 hours at the above temperature. The reactants are essentially dry.

The chemical reaction in the slurry process is essentially the same as in the fusion process except that relatively large amounts of water is present in the reaction mixture. The water holds the temperature of reaction at or below the boiling point of the water. The reaction takes 2 or more hours to obtain a product of relatively high purity, after which the water must be evaporated from the soap. The large amount of water used makes this process somewhat difficult to handle.

The metal-acid reaction process is a relatively new development. Under proper conditions glyceride oils and the fatty acids may be made to react directly with a metal powder in a finely subdivided state. The evolution of hydrogen during the reaction necessitates taking extra measures of safety. In the case of cobalt or iron powder, hydrogen is not actually involved in the process, although the reaction is essentially one of a metal ion reacting with an acid radical to form the metal soap and hydrogen. It is thought that the metal in the presence of water and air first oxidizes to form either a metal oxide or a metal hydroxide; these in turn reacting with the acid. Briefly, the metal powder is fed into the reaction vessel which contains the fatty acid. A small amount of water is introduced, compressed air is admitted to the bottom of the reactor, and heat is applied. The reaction takes 8 to 12 hours.

We have discovered a process wherein saponification is initiated at a relatively low temperature in a reaction which is complete in a matter of minutes rather than hours, and wherein we are able to take advantage of the catalytic effect of water in initiating the reaction and at the same time to take full advantage of the heat liberated in the exothermic reaction. The metal soap product has a low free fatty acid and moisture content. Thus, we are able to produce much more rapidly a product of equal or superior quality as any one of the aforementioned processes. Because the reaction is so rapid, the instant process can be adapted readily to a continuous metal soapmaking process.

The process of the present invention involves the reaction of a metallic oxide or metal hydroxide with free fatty acids to obtain the polyvalent metal soap. A small amount of water is added to initiate the saponification reaction.

The amount of water added to the mixture will generally fall within the range of 0.5 to 3.0 mols per mol of metal oxide or metal hydroxide. The reaction generally is complete in 3 to 5 minutes, yields a product of light color with low amounts of unreacted fatty acids in the final product. The temperature of reaction rises in the vicinity of 250°–350° F.

More specifically, fatty acids and the metal oxide or metal hydroxide, particularly lead and those metals falling within group II of the periodic table (beryllium, magnesium, calcium, zinc, strontium, cadmium, and barium) and preferably in excess up to 50% above stoichiometric, are mixed under sufficient heat to liquefy the fatty acids. The fatty acids are those aliphatic, monocarboxylic, high molecular weight acids such as stearic, oleic, linoleic, palmitic, lauric, etc. Water is added in an amount between about 0.5 and 3.0 mols of water per mol of the metal oxide or metal hydroxide. At a temperature varying with the type of fatty acid and the particular metal oxide or hydroxide, an exothermic reaction begins. This temperature is generally in the vicinity of 150°–250° F. The exothermic reaction causes the temperature to rise, driving off the small amount of water. The temperature continues to rise until equilibrium is attained—generally a temperature around 250°–300° F. Saponification is essentially complete at this point. The soaps are then cooled and pulverized.

One of the advantages of the foregoing reaction is that it can be carried to completion under atmospheric conditions. The rapid reaction and relatively low temperature of reaction as compared to the fusion process contribute to a reduced tendency to form dark discolorations in the metal soap. The reaction in general will start at about 20° F. above the melting point of the fatty acid or the fatty acid mixture. The final product has little or no entrained water and is low in free fatty acid. These characteristics make the calcium soap, for example, well adapted for use as a wire drawing soap. When melted, the soap has a clear color.

The following examples are provided to illustrate our process.

EXAMPLE I

One hundred grams of stearic acid and 15 grams of calcium oxide are mixed and heated. At a temperature of 200° F., 4.7 grams of water were added to the reaction mixture. Saponification began at 215° F. and was complete at about 310° F. The reaction was very rapid. The calcium soap had a free fatty acid content of 0.65% and contained 1.3% moisture.

EXAMPLE II

One hundred grams of stearic acid was heated to 175° F. and 20 grams of calcium oxide was added. Heating was continued and at 200° F., 3.2 grams of water was added. Heating was further continued. At 215° F. saponification began. The saponification was completed at 355° F. The final product had the following analysis: 0.16% free fatty acid and 0.8% moisture.

EXAMPLE III

One hundred grams of stearic acid was heated, and at 175° F. 20 grams of calcium oxide was added. Heating was continued and at 205° F. 6.5 grams of water was added. The reaction began at 205° F. and went very rapidly to completion at about 310° F. The calcium stearate had a free fatty acid content of 0.16% and a moisture content of 1.74%.

The above procedure was repeated using 10 grams of water. Saponification began at 205° F. and was complete at 255° F. Analysis of calcium stearate was: 0.65% free faty acid, 1.94% moisture.

EXAMPLE IV

One hundred grams of stearic acid and 10.6 grams of magnesium oxide were mixed at 180° F.; 3.2 grams of water was added and heating was continued. At 210° F. the saponification reaction began. The reaction went to completion at about 220° F. in five minutes. The final product had 5.8% free fatty acid and 3.0% moisture.

EXAMPLE V

One hundred grams of tallow fatty acids was heated, and at 170° F. 10 grams of calcium oxide was added. Heating was discontinued and 3.2 grams of water was added. Saponification began at 165° F. The calcium soap analyzed as follows: 0.34% free fatty acid, and 2.99% moisture.

EXAMPLE VI

One hundred grams of stearic acid and 18.75 grams of zinc oxide were mixed at 180° F.; 5.0 grams of water was added, and heating was continued. At 210° F. saponification began and the reaction went to completion in 5 minutes at 240° F. The zinc stearate had 2.8% free fatty acids and 3.0% moisture.

EXAMPLE VII

One hundred grams of stearic acid and 33 grams of cadmium oxide were mixed at 180° F., at which point 5.0 grams of water were added. Heating was continued and saponification began at 210° F. The reaction went to completion at 410° F. in 10 minutes. The water boiled out at about 260° F. The reaction slowed at 390° F., but went rapidly with thickening at 390°–410° F. Total reaction time was 15 minutes.

EXAMPLE VIII

Equivalent amounts of stearic acid and CaO (one hundred grams of stearic acid and 10 grams of CaO) were mixed at 190° F. At 205° F., 3.2 grams of water was added. The exothermic reaction began at 193° F. and was completed at 300° F. The calcium stearate analyzed: free fatty acid, 0.20% and moisture, 3.99%.

EXAMPLE IX

Twenty pounds of stearic acid and two pounds of calcium oxide were mixed together and heated, and thereafter 0.32 pound of water was added at 165° F. The reaction began at 200° F. Cooling was applied to the reaction mixture, and the saponification was complete at 230° F. The calcium stearate analyzed: 2.29% free fatty acid and 0.15% moisture.

EXAMPLE X

Calcium oxide and stearic acid were reacted without adding water thereto in ratios of 10, 15, and 20 parts by weight of CaO to 100 parts of acid. Similar reactions were run wherein water was added to initiate the reaction according to the teachings of our invention. Data observed in each saponification is tabulated below:

*Table I*

| Parts Stearic Acid | Parts CaO | Parts H$_2$O | Temp. H$_2$O Added, °F. | Temp. Oxide Added, °F. | Temp. Rxn. Starts, °F. | Temp. Rxn. Complete, °F. | FFA, Percent | Moisture, Percent |
|---|---|---|---|---|---|---|---|---|
| 100 | 10 | 0 | ------ | 200 | 380 | 420 | 9.64 | 0.5 |
| 100 | 15 | 0 | ------ | 175 | 408 | 435 | 0.02 | 0.25 |
| 100 | 20 | 0 | ------ | 250 | 395 | 445 | 0.16 | 1.39 |
| 100 | 10 | 3.2 | 210 | 200 | 220 | 305 | 10.72 | 1.2 |
| 100 | 15 | 4.7 | 200 | 195 | 215 | 310 | 0.65 | 1.3 |
| 100 | 20 | 3.2 | 200 | 175 | 215 | 355 | 0.16 | 0.8 |

EXAMPLE XI

Two pounds of CaO and 18 pounds of stearic acid were mixed together at 180° F., and at 200° F., 0.7 pound of water was added. The reaction began at 210° F., and near the end of the reaction six pounds of calcium hydroxide was added. The product had 0.33% free fatty acids and 1.35% moisture.

EXAMPLE XII

One hundred grams of stearic acid and 13.2 grams of Ca(OH)$_2$ were mixed together at 170° F. Water was then added, and the reaction began at 160° F. With no application of heat, the mixture warmed to 175° F. where it appeared like a heavy cream. The product, after standing overnight, analyzed: free fatty acids, 3.7%, and moisture, 2.3%.

Obviously many modifications and variations of the invention as hereinbefore set forth may be made without departing from the spirit and scope thereof, and therefore only such limitations should be imposed as are indicated in the appended claims.

We claim:

1. In a method for manufacture of metallic soaps, the steps which comprise: mixing higher aliphatic, monocarboxylic acids and a composition from the group consisting of hydroxides and oxides of metals of group II of the periodic table, initiating saponification of said acids at a temperature in the range of 150–250° F. in the presence of about 0.5–3.0 mols of water per mol of said composition, and allowing exothermic saponification to go to completion.

2. In a method for manufacture of metallic soaps, the improvement which comprises: adding to a mixture of higher aliphatic monocarboxylic acids heated to a temperature of about 20° F. above the melting point of the fatty acids and at least a stoichiometric amount of a metallic composition from the group consisting of oxides and hydroxides of metals of group II of the periodic table a small amount of water in the range of 0.5–3.0 mols of water per mol of said composition to initiate saponification at a relatively low temperature.

3. The method of claim 1 wherein said composition is a metal oxide.

4. The method of claim 1 wherein said composition is an alkaline earth metal oxide.

5. The method of claim 1 wherein said composition is calcium oxide.

6. The method of claim 1 wherein said composition is magnesium oxide.

7. The method of claim 1 wherein said composition is zinc oxide.

8. The method of claim 1 wherein said composition is calcium hydroxide.

9. The method of claim 2 wherein said composition is metal oxide.

10. The method of claim 2 wherein said composition is an alkaline earth metal oxide.

11. The method of claim 2 wherein said composition is a calcium oxide.

12. The method of claim 2 wherein said composition is magnesium oxide.

13. The method of claim 2 wherein said composition is zinc oxide.

14. The method of claim 2 wherein said composition is calcium hydroxide.

References Cited in the file of this patent
UNITED STATES PATENTS 2,650,932    Kebrich et al. _____ Sept. 1, 1953
2,753,363    Wine _____ July 3, 1956

OTHER REFERENCES

Elliot: "The Alkaline Earth and Heavy Metal Soaps" (copyright 1946), p. 96.